April 24, 1951  R. A. SFORZINI  2,549,858
ANNULAR COMBUSTION CHAMBER HAVING TELESCOPING
WALLS WITH CORRUGATED ENDS FOR SPACING
Filed July 30, 1946
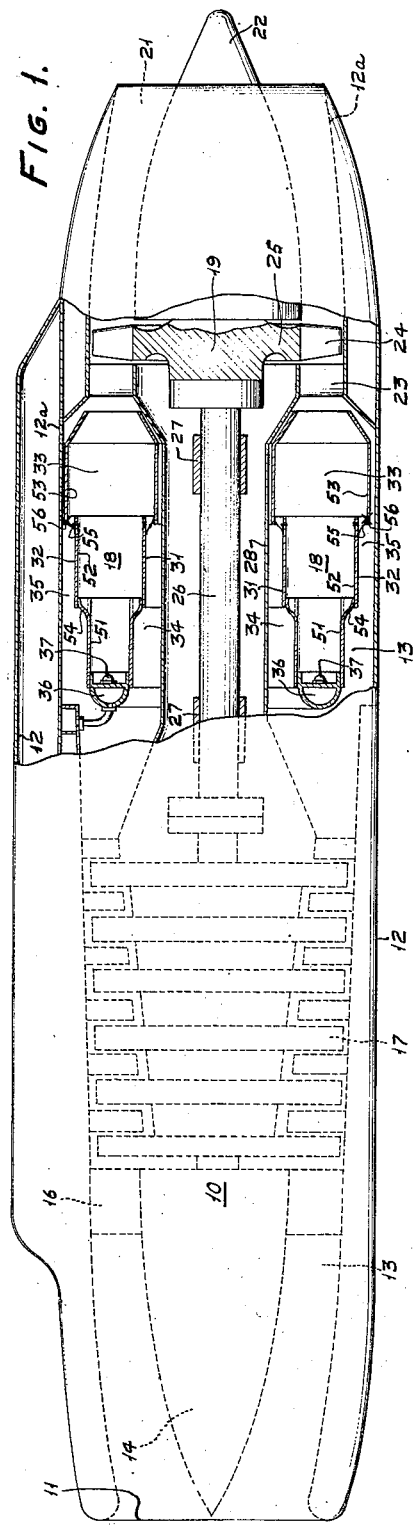
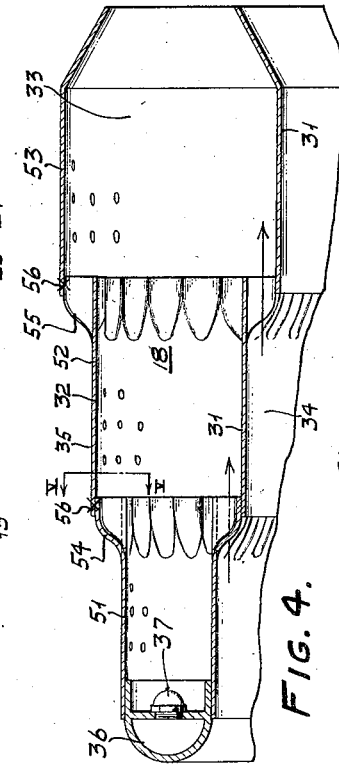
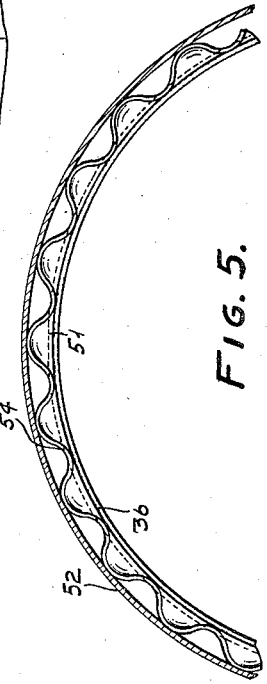
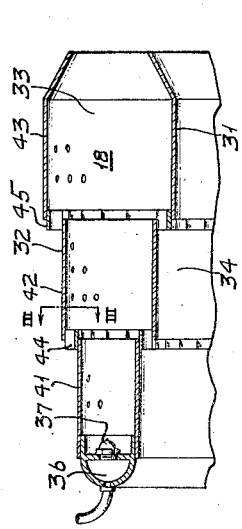
INVENTOR
ROBERT A. SFORZINI.
BY
ATTORNEY Patented Apr. 24, 1951

2,549,858

UNITED STATES PATENT OFFICE 2,549,858

ANNULAR COMBUSTION CHAMBER HAVING TELESCOPING WALLS WITH CORRUGATED ENDS FOR SPACING

Robert A. Sforzini, Pittsburgh, Pa., assignor to Westinghouse Electric Corporation, East Pittsburgh, Pa., a corporation of Pennsylvania Application July 30, 1946, Serial No. 687,127

4 Claims. (Cl. 60—44)

This invention relates to combustion apparatus, more particularly to combustion chamber structure, and has for an object to provide novel structure of this character.

Another object of the invention is to provide a combustion chamber whose side walls are of stepped construction, the risers of the steps being so constructed as to provide for admission therethrough of air to the combustion chamber.

Yet another object of the invention is to provide a combustion chamber wall of stepped construction, the riser of each step being formed integral with one of its adjacent steps.

A further object of the invention is to provide a combustion chamber wall comprised by cylindrical sections of different diameters, together with spacers integral with the sections providing risers at the stepped joints between adjacent sections, the risers providing for passage of air therethrough to the combustion chamber.

These and other objects are effected by the invention as will be apparent from the following description and claims taken in connection with the accompanying drawing, forming a part of this application, in which:

Fig. 1 is a side elevational view of a gas turbine power plant incorporating the present invention, a portion of the outer casing and part of the inner structure being broken away to better illustrate the novel features;

Fig. 2 is an enlarged longitudinal sectional view of a portion of a combustion chamber of prior construction to illustrate the problem solved by the present invention;

Fig. 3 is a fragmentary sectional view, taken along the line III—III of Fig. 2, looking in the direction indicated by the arrows;

Fig. 4 is a view similar to Fig. 2 but illustrating the improved construction of the present invention; and Fig. 5 is a fragmentary sectional view, taken along the line V—V of Fig. 4, looking in the direction indicated by the arrows.

The present invention, although not limited thereto, is particularly adapted for use with a gas turbine power plant of the type employed on aircraft to drive the propeller or an electric generator or to supply motive fluid for jet propulsion of the aircraft. Such a plant preferably comprises a streamlined tubular casing having mounted axially therein a compressor adjacent the forward or inlet end, a turbine adjacent the rearward or discharge end, and combustion apparatus located between the compressor and the turbine for heating the compressed air and which discharges the hot gases at suitable temperature and pressure to the turbine. The spent gases on leaving the turbine are discharged through a nozzle provided at the rear of the casing and may aid in propelling the aircraft.

Referring now to the drawing more in detail, the power plant shown in Fig. 1, and indicated in its entirety by the reference character 10, is adapted to be mounted in or on the fuselage or wing of an aircraft with the left end or intake 11, as viewed in this figure, pointed in the direction of flight.

The plant comprises an outer shell or casing structure 12—12a providing an annular air duct or passage 13 extending fore and aft with respect to the aircraft. This casing has mounted herein, along its longitudinal axis, a fairing cone 14 adapted to house gearing connecting through a hollow guide vane 16 with auxiliaries (not shown), an axial-flow compressor 17, combustion apparatus generally indicated 18, a turbine 19 which drives the compressor, and a nozzle 21 defined by the casing 12a and by a tailpiece 22, the latter being mounted concentrically in the casing and cooperating with the latter to provide the propulsion nozzle.

Air enters at the intake 11 and flows substantially straight through the plant, passing through the compressor 17, where its pressure is raised, and into the combustion apparatus 18, where it is heated. The hot gases, comprising the products of combustion and excess air heated by the combustion, on leaving the combustion apparatus are directed by suitable guide vanes or nozzles 23 against the blades 24 of the turbine disc 25, and then are discharged through the propulsion nozzle 21 to propel the aircraft.

By reference to Fig. 1, it will be seen that the compressor and turbine rotors are interconnected by means of a shaft 26 supported by suitable bearings 27 and enclosed by an inner wall structure, generally indicated 28, which protects the shaft and bearings from high temperatures and also defines a portion of the annular air flow passage 13 in which the combustion apparatus 18 is disposed.

The present invention is not limited to the specific details or arrangements of structure thus far described, but is primarily concerned with the combustion apparatus, indicated generally at 18.

A pair of frusto-conical inner and outer wall members 31 and 32, respectively, separate the annular flow passage 13, at the region of the combustion apparatus 18, into an annular burner or combustion space 33 overlapped both inwardly and outwardly by annular air spaces 34 and 35, respectively. The annular inner wall 31 is disposed with its base or larger end upstream and the annular outer wall 32 has its larger end or base downstream with the result that the burner space 33 defined by these two walls increases in cross-sectional area from its upstream end to its downstream end. Conversely, the inner and outer overlapping air spaces 34 and 35, the former defined by the walls 28 and 31 and the latter by the walls 12a and 32, decrease in cross-sectional area from their upstream ends to their downstream ends.

Preferably, the upstream end of the burner space 33 is closed by an annular wall 36, in which is mounted an annular series of fuel nozzles 37 adapted to direct the fuel discharging therefrom downstream in directions parallel to the longitudinal axis of the power plant.

It has heretofore been proposed to make the inner and outer walls 31 and 32 of stepped construction, in the manner illustrated in Figs. 2 and 3 herein. In this construction, the wall 32 is made up of a plurality of cylindrical sections 41, 42 and 43, of increasing diameter in the order mentioned. Adjacent ends of the cylindrical sections are united by spacer members 44 and 45 which are corrugated circumferentially, the spacers constituting risers in the stepped wall construction, and the corrugations thereof providing for admission of air to the burner space 33 from the overlapping air space 35. Preferably, the inner wall 31 is of similar construction. This construction, as illustrated in Figs. 2 and 3, constitutes the subject matter of copending application Serial No. 687,194, filed July 30, 1946, and assigned to the assignee of the present invention. For a more detailed disclosure, reference may be had to said copending application.

This prior construction, while highly satisfactory in performance, has been found to be quite expensive to manufacture, due to each spacer member 44 and 45 being a separate part and requiring welding to each of the adjacent cylindrical sections 41—42 and 42—43, respectively, and the present invention seeks to provide a less expensive construction, but one which, nevertheless, is equally satisfactory from the performance standpoint.

Accordingly, reference is made to Figs. 4 and 5, wherein inner and outer walls 31 and 32 and end wall 36 are arranged in the prior construction to separate the burner space 33 from the overlapping inner and outer air spaces 34 and 35, respectively.

The outer wall 32 is made up of a plurality of cylindrical sections 51, 52 and 53, of progressively greater diameters in the order mentioned and from the upstream end of the burner space to the downstream end thereof. The downstream end of each cylindrical section 51 and 52 has a spacer member or riser 54 and 55, respectively, formed integral therewith by deforming the material thereof outwardly, preferably by corrugating it circumferentially. This constitutes a relatively simple forming operation, and the only securing action required to retain the adjacent sections assembled is to weld, as at 56, the smooth end of each section to the corrugated spaced portion 54 or 55 inserted therein.

As previously indicated, the novel construction herein disclosed not only functions in a manner equivalent to the prior construction, but has the advantage of simplicity, both as to number of parts and as to steps of assembly, and permits a decrease in the radial space required.

While the invention has been shown in but one form, it will be obvious to those skilled in the art that it is not so limited, but is susceptible of various changes and modifications without departing from the spirit thereof.

What is claimed is:

1. In combustion apparatus, wall structure defining a burner space and an overlapping air space, said wall structure including an annular wall separating said burner space from said overlapping air space, said wall comprising a plurality of concentric annular sections disposed in axially-offset relation with their adjacent end portions overlapped, said sections being of different diameters with the section of smallest diameter at the upstream end of the burner space and the diameters increasing from said smallest section to the largest diameter section at the downstream end of the burner space, and the overlapped end only of each of said sections being corrugated throughout the axial length of the overlap to provide passages at the joints between adjacent sections for admission of air to the burner space from the overlapping air space.

2. Structure as specified in claim 1, wherein the overlapping portion of each section is welded to convolutions of the corrugated portion of the section overlapped thereby.

3. In combustion apparatus, wall structure defining a burner space and an overlapping air space, said wall structure including an annular wall separating said burner space from said overlapping air space, said annular wall comprising a plurality of cylindrical members concentric about a common axis and offset axially with their adjacent ends overlapped in joints, and one of said ends being corrugated throughout the axial length of the overlap, whereby passages are provided through the joints for entry of air to the burner space from the overlapping air space.

4. In combustion apparatus, a burner wall comprising a plurality of cylindrical sections each of a different diameter and having one end only corrugated circumferentially, said sections being arranged with the corrugated portion only of each section disposed in telescoped relation with respect to the cylindrical end of the section of nearest diameter, whereby openings are provided for passage of air from one side of said wall to the other side thereof.

ROBERT A. SFORZINI.

REFERENCES CITED

The following references are of record in the file of this patent:

UNITED STATES PATENTS

| Number | Name | Date |
|---|---|---|
| 1,163,650 | Fogler | Dec. 14, 1915 |
| 1,280,312 | Scherer | Oct. 1, 1918 |
| 1,324,897 | Holub | Dec. 16, 1919 |
| 2,117,270 | Bloom | May 17, 1938 |
| 2,409,177 | Allen | Oct. 15, 1946 |
| 2,446,059 | Peterson | July 27, 1948 |
| 2,448,561 | Way | Sept. 7, 1948 |

FOREIGN PATENTS

| Number | Country | Date |
|---|---|---|
| 539,069 | Great Britain | Aug. 27, 1941 |